United States Patent Office 3,032,530
Patented May 1, 1962

3,032,530
METHOD OF PREPARING POLY-
SILOXANE GUMS
Richard A. Falk, Midland, Mich., assignor to Dow Corning Corporation, Midland, Mich., a corporation of Michigan
No Drawing. Filed Oct. 13, 1958, Ser. No. 766,677
7 Claims. (Cl. 260—46.5)

This invention relates to a method of condensing hydroxylated siloxanes to form siloxane gum homopolymers and copolymers.

This application is a continuation-in-part of applicant's copending application Serial Number 655,527, filed April 29, 1957, now abandoned.

The two primary mechanisms by which siloxanes are polymerized in commercial operation are the condensation of silicon-bonded hydroxyls and the rearrangement of SiOSi bonds. The former method is primarily employed in the preparation of organosiloxane resins having less than two hydrocarbon groups per silicon. The second method is the one primarily employed in the preparation of polymers for use in siloxane rubbers. These polymers generally have an average of two organic groups per silicon. Both methods have been employed in the preparation of siloxane fluids having more than two organic groups per silicon.

Certain materials act exclusively as "hydroxyl condensation" catalysts. These include weak acids such as acetic acid and weak alkalis such as ammonia or amines. Other materials such as strong acids and bases act as both condensation and SiOSi bond rearrangement catalysts.

It has been found that for commercial operation it was necessary to rely primarily on the mechanism of siloxane bond rearrangement in order to produce high polymers in the fluid and rubber field. This was true because there was no heretofore known "hydroxyl condensation" catalysts which would carry low molecular weight hydroxylated siloxanes to high molecular weight polymers at a commerically feasible rate. These high polymers have heretofore been prepared almost exclusively by the action of siloxane bond-rearranging catalysts.

One of the chief disadvantages of a siloxane bond-rearranging catalyst is that the polymerization is reversible. Thus, whether the bond rearrangement results in increase or decrease of molecular weight depends on the conditions of the reaction. Also, the end product of any polymerization represents an equilibrium between high molecular weight polymers and extremely low molecular weight polymers such as cyclic trimers, tetramers and the like. When the polymers are vulcanized the presence of these low polymers in the resulting elastomer is detrimental. Furthermore, since the siloxane bond-rearranging catalyst is capable of depolymerizing a polymer, it is necessary to neutralize or otherwise remove the catalyst after the polymerization is complete. This often involves time-consuming and expensive processes.

For the above reasons it is highly desirable to have a catalyst which will carry siloxanes to high molecular weight without rearranging siloxane bonds. Such a catalyst would produce an irreversible polymerization and would not necessarily have to be removed after polymerization was complete.

It is the object of this invention to provide a method of polymerizing siloxanes which avoids siloxane bond rearrangement during the polymerization process. Another object is to provide a new method for producing volatile-free gums having an average of more than 1500 silicon atoms per molecular chain from polymers having an average of as few as 150 silicon atoms per molecular chain. Other objects and advantages will be apparent from the following description.

In accordance with this invention siloxane polymers and copolymers are prepared by heating a mixture of (1) an organopolysiloxane having an average degree of polymerization of at least 150 and containing per molecule at least two silicon-bonded hydroxyl groups, said organopolysiloxane having per silicon atom an average of from 1.99 to 2.0 organic radicals attached to the silicon by silicon-carbon linkages, of which organic radicals at least 40% are methyl radicals and the remainder contain no active hydrogen and (2) an organic isocyanate having only one isocyanate group in the molecule, whereby the degree of polymerization of the organopolysiloxane is increased to at least 1500. The term "degree of polymerization" is a number equal to the average for all the polysiloxane molecules present of the number of siloxane units per molecule. The abbreviation used in this application for "degree of polymerization" is D.P. All organopolysiloxanes having a D.P. of 1500 or above are gums otherwise referred to as high molecular weight polymers.

More specifically, the organopolysiloxanes employed in this invention contain at least two SiOH groups per molecule and contain an average of from 1.99 to 2.0 organic groups per silicon atom attached to the silicon by silicon-carbon linkages, said organic groups being free of active hydrogen. At least 40% of these organic radicals must be methyl radicals.

The term "free of active hydrogen" as employed in the specification and claims means that the materials contain no hydrogen atoms capable of reacting with methyl magnesium chloride to give methane. This hydrogen is found in such groups as OH, COOH, SH, $NH_2$, $$-\overset{R}{N}H$$

or other disubstituted amino groups, $CONH_2$ and CSSH. All of these groups are capable of reacting with the isocyanates employed in this invention to give undesirable by-products.

Any organic isocyanate in which the isocyanate group is attached to a carbon and in which there is only one isocyanate group per molecule can be employed in the process of this invention. The isocyanates can contain other functional groups in the molecule which do not contain active hydrogen. Thus, for example, the isocyanates can contain nitrile, halogen, nitro, ester, ether, sulfide and tertiary amine groups in addition to the isocyanate radical.

Specific examples of isocyanates which are operative herein are aliphatic isocyanates such as methyl isocyanate, butyl isocyanate, octadecyl isocyanate and hexenyl isocyanate; cycloaliphatic isocyanates such as cyclohexyl isocyanate and cyclohexenyl isocyanate; and aryl isocyanates such as xenyl isocyanate, bromophenyl isocyanate, anthracyl isocyanate, para-dimethyl amino phenyl isocyanate, and para-methoxy phenyl isocyanate.

Diisocyanates are not suitable for use in this invention and the reaction products of silanols and diisocyanates are not equivalent to the polymers produced by the method of this invention.

The process of this invention is believed to proceed by way of a condensation of two silicon-bonded hydroxyl groups under the influence of the isocyanate. The precise mechanism for the reaction is not apparent. However, the by-products of the reaction are carbon dioxide and a disubstituted urea. Consequently, it is believed that the reactions occurring may be represented by the following schematic equations:

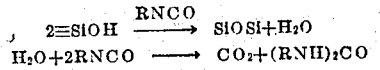

The polymerization of this invention can be carried out by heating the mixture at any temperature ranging from below room temperature up to the decomposition point of the siloxane, that is 250° C. or above. The precise temperature employed varies with the particular isocyanate. For example, some isocyanates are active polymerizers at room temperature. Other isocyanates such as phenyl isocyanate are inactive at room temperature but polymerize rapidly at from 140 to 150° C. With this type of isocyanate the rate and degree of polymerization can be precisely controlled by raising and lowering the temperature.

The proportions of isocyanate to organopolysiloxane are not critical. However, for practical purposes it is preferred that the amount of isocyanate employed be in the range from .5 to 1.5 mols of isocyanate per mol of SiOH in the organopolysiloxane. Within this range polymerization proceeds with the maximum efficiency and the amount of by-produced urea is held to a minimum. It should be understood, of course, that polymerization proceeds when less than or more than the above amount of isocyanate is employed.

If desired, the reactions of this invention can be carried out either at atmospheric, superatmospheric or subatmospheric pressure. Obviously, the pressure should be such so as not to cause the isocyanate to volatilize from the reaction zone.

Specifically, the organopolysiloxanes which are operative herein are siloxanes of the unit formula $R'_n SiO_{4-n}$ in which $n$ has an average value of from 1.99 to 2.0, and 40% of the R' radicals are methyl radicals. Each molecule contains at least two silicon-bonded hydroxyls. Furthermore, in order to achieve a high polymer product, i.e. a gum with a D.P. of 1500, having good elastomeric properties when incorporated into a rubber stock, it is necessary that the polysiloxane starting materials have an average D.P. of at least 150. For optimum properties the original average D.P. should be at least 300. If the starting siloxanes have an average D.P. above these minimum limitations, then the ultimate products having D.P.'s above 1500 will inherently be substantially better elastomeric gums than gums prepared from starting siloxanes having D.P.'s below 150. A dimethylpolysiloxane having a D.P. of 1500 has a viscosity of approximately 500,000 cs. at 25° C.

The organopolysiloxane starting material can be a homopolymer, a copolymer, or a mixture of polymers. The process of this invention is equally applicable for the preparation of homopolymers in which all of the siloxane units are the same and for the preparation of copolymers in which two or more different siloxane units are present. Block copolymerization, i.e. copolymerization of polymeric "blocks" without rearrangement within any "block," is accomplished by heating a mixture of the isocyanate and at least two different organopolysiloxane homopolymers or copolymers each of which contains at least two silicon-bonded hydroxyl groups per molecule.

Where the starting organopolysiloxane is a mixture of polymers having different D.P.'s, it is only necessary that the average D.P. of the mixture is at least 150. For example, for every molecular chain of 10 silicon atoms there would have to be a molecular chain of at least 290 silicon atoms or two chains of at least 220 silicon atoms or 1 chain of 130 silicon atoms and one chain of at least 310 silicon atoms. The process of this invention is also applicable with siloxanes containing residual hydrolyzable groups such as alkoxy, aryloxy, halogen and acyloxy.

Specific examples or organopolysiloxanes which are operative herein are hydroxylated siloxanes in which the siloxane units are any combination of the following such that 40% of the total organic radicals are methyl radicals: octadecylsiloxane, chlorophenylmethylsiloxane, α,α,α-trifluorotolylmethylsiloxane, hexenylmethylsiloxane, cyclohexylsiloxane, cyclopentylmethylsiloxane, cyclohexenylmethylsiloxane, dibutylsiloxane, chloromethylmethylsiloxane, chloromethylphenylsiloxane, phenylhydrogensiloxane, xenylmethylsiloxane, dimethylsiloxane, phenylmethylsiloxane, diphenylsiloxane, bis-3,3,3-trifluoropropylsiloxane, naphthylethylsiloxane, β-cyanoethylsiloxane, gamma-methoxypropylmethylsiloxane, trifluoromonochlorocyclobutylmethylsiloxane, trifluorovinylmethylsiloxane, gamma-acetoxypropylmethylsiloxane,

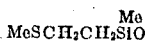

gamma-dimethylaminopropylmethylsiloxane, p-nitrophenylmethylsiloxane and dimethylhydrogensiloxane.

The organopolysiloxanes can also contain hydrolyzable groups attached to the silicon such as halogen, e.g. chlorine, bromine and fluorine, and hydrocarbonoxy groups, e.g. alkoxy groups such as methoxy, ethoxy, octadecyloxy; aroxy groups such as phenoxy, toluyloxy, and xenyloxy; alkenyloxy groups such as allyloxy, hexenyloxy and cycloaliphatic hydrocarbonoxy groups such as cyclohexyloxy and cyclohexenyloxy; and acyloxy groups such as acetoxy, propionyloxy, benzoyloxy, and stearyloxy.

The process of this invention is commercially applicable to the preparation of high molecular weight polysiloxanes for use in siloxane rubbers. These polymers can be prepared free of volatile cyclic materials. This reaction is particularly advantageous with those siloxanes which are prone to revert to cyclics under the influence of siloxane rearrangement catalysts such as alkali metal hydroxides or acids. The process of this invention is also particularly desirable for preparing high polymers containing alkali-sensitive groups such as the chloromethyl group or the trifluorocyclobutyl group. The method of this invention is also applicable to the preparation of triorganosilyl-endblocked diorganosiloxane fluids and for the curing of organosiloxane resins.

Another unique feature of the process of this invention is that the polymerization can be carried out in the presence of solvents without forming any appreciable amount of low molecular weight cyclic siloxanes. Thus, for the first time solvent polymerization with a wide range of solvents has become possible in the organosilicon industry through this invention.

The following examples are illustrative only and should not be construed as limiting the invention which is properly delineated in the appended claims. The term "hydroxylated" as employed below means that the siloxanes contain at least two SiOH groups per molecule. All viscosities in the examples were measured at 25° C. unless otherwise indicated. The D.P.'s shown are approximate. All of the gums produced in Examples 1, 2, 3, 4, 5, 6 and 7 which are identical with those produced in Examples 1, 2, 3, 5, 6, 11 and 12 respectively of the parent case, the aforementioned copending application Serial Number 655,527, have D.P.'s of at least 1500. The average D.P. of the starting siloxanes in each of these examples was at least 150.

EXAMPLE 1

19.2 g. of a 14,400 cs. hydroxy-end-blocked dimethylsiloxane fluid (D.P.=580) were mixed with .16 g. of phenyl isocyanate. After heating the mixture 24 hours at 150° C., the fluid was converted into a gum having a viscosity of $6 \times 10^6$ cs. (D.P.=2700).

EXAMPLE 2

18 g. of a 6000 cs. ethylmethylpolysiloxane fluid (D.P.=440) having hydroxyl end groups were mixed with .66 g. of phenyl isocyanate and the mixture was heated at 150° C. for 72 hours. The viscosity had increased to $8.6 \times 10^6$ cs. (D.P.=2800).

EXAMPLE 3

21.2 g. of a hydroxylated copolymer of 99.935 mol percent dimethylsiloxane and .065 mol percent monomethylsiloxane, said copolymer having a viscosity of 31,000 cs. (D.P.=740), were mixed with .21 g. of phenyl isocyanate and the mixture was heated at 150° C. In 7½ hours the mixture had set to a tough gel.

EXAMPLE 4

101.2 g. of a 260,000 cs. fluid hydroxylated copolymer of 99.5 mol percent trifluoropropylmethylsiloxane and .5 mol percent vinylmethylsiloxane, 6.1 g. of a 3450 cs. hydroxylated dimethylsiloxane fluid and 2 g. of phenyl isocyanate were mixed and heated at 150° C. for 20 hours. The resulating product was a copolymer gum containing trifluoropropylmethylsiloxane, vinylmethylsiloxane and dimethylsiloxane units.

EXAMPLE 5

A mixture of 3.62 g. of a 65,000 cs. hydroxylated phenylmethylsiloxane fluid and 37 g. of a 3650 cs. hydroxylated dimethylpolysiloxane fluid were mixed with .9 g. of phenyl isocyanate and the mixture was heated 22 hours at 150° C. The resulting product was a copolymer gum of 95 mol percent dimethylsiloxane and 5 mol percent phenylmethylsiloxane.

EXAMPLE 6

17 g. of a 16,300 cs. hydroxylated copolymer of 47.5 mol percent dimethylsiloxane and 52.5 mol percent of

and 2.1 g. of phenyl isocyanate were mixed and heated 20 hours at 150° C. The fluid was converted into a high polymer gum.

EXAMPLE 7

A series of hydroxylated dimethylpolysiloxane fluids having the viscosities shown in the table below were mixed with the various isocyanates shown below in amount so that there was one molecule of isocyanate per silicon-bonded hydroxyl in the fluid. Each of the mixtures was then heated at 150° C. for the times indicated and the viscosities obtained are shown in the table.

Table

| Starting viscosity of dimethyl-siloxane in cs. | D.P. | Isocyanate employed | Viscosity in cs. after heating at the various temperatures | | |
|---|---|---|---|---|---|
| | | | 24 hours | 48 hours | 72 hours |
| 5,075 | 420 | naphthyl isocyanate. | 1×10⁶ | | |
| 14,400 | 580 | 2,5-dichlorophenylisocyanate. | .95×10⁶ | 15×10⁶ | 150×10⁶ |
| 14,400 | 580 | m-nitrophenylisocyanate. | 590,000 | 1.8×10⁶ | 34×10⁶ |
| 14,400 | 580 | p-nitrophenylisocyanate. | 230,000 | 750,000 | 1.1×10⁶ |

EXAMPLE 8

When the following hydroxylated siloxanes, each having an initial average D.P. of 1000, are heated with phenyl isocyanate in amount of .4 molecule of isocyanate per OH group, at 150° C. for 72 hours, polymerization of the siloxanes to D.P.'s over 1500 takes place:

β-Cyanoethylmethylpolysiloxane
Gamma-acetoxypropylmethylpolysiloxane
Chloromethylmethylpolysiloxane

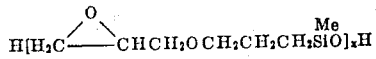

p-Bromophenylmethylpolysiloxane
A mixture of 90 mol percent phenylmethylpolysiloxane and 10 mol percent diphenylpolysiloxane
A mixture of 5 mol percent octadecylmethylpolysiloxane, 10 mol percent dibutylpolysiloxane, 20 mol percent cyclohexylmethylpolysiloxane and 65 percent dimethylpolysiloxane
A copolymer of 57 mol percent dimethylsiloxane and 43 mol percent of methylhydrogensiloxane units

EXAMPLE 9

When a 1000 cs. dimethylpolysiloxane fluid (D.P.=220) having at least two silicon-bonded hydroxyl groups per molecule is mixed with ethyl isocyanate in a ratio of one molecule of isocyanate per silicon-bonded hydroxyl in the fluid and heated in a closed container at 150° C. for 72 hours, the resulting polymer has a viscosity over 800,000 cs. (D.P.=1700).

EXAMPLE 10

When a 135,000 cs. hydroxylated dimethylpolysiloxane (D.P.=1100) is mixed with octadecylisocyanate in a ratio of 1.3 molecules isocyanate per silicon-bonded hydroxyl in the polysiloxane and is heated at 110° C. for 72 hours, the resulting polymer has a D.P. over 1500.

EXAMPLE 11

Polymerization to a gum having a D.P. above 2000 occurs without removal of ethoxy groups when a hydroxylated dimethylpolysiloxane having a D.P. of 700 and containing an average of 0.07 silicon-bonded ethoxy groups per silicon atom is mixed with phenyl isocyanate in amount of one isocyanate molecule per silicon-bonded hydroxyl group in the polysiloxane and the mixture is heated for 24 hours at 150° C.

EXAMPLE 12

When 0.1 mol of a polysiloxane composed of two phenylmethylvinylsiloxane units, two $CH_3Si(OH)O$ units and six dimethylsiloxane units is mixed with 0.1 mol of a hydroxy-endblocked dimethylpolysiloxane having a degree of polymerization of 450 and 0.4 mol of phenylisocyanate and the mixture is heated for 48 hours at 150° C., the resulting copolymer has a degree of polymerization above 1500.

That which is claimed is:

1. A method of preparing a high polymer diorganopolysiloxane which comprises heating in the absence of any other polymerization catalyst a mixture of (1) an organopolysiloxane having an average degree of polymerization of at least 150 and containing at least two silicon-bonded hydroxyl groups per molecule, said organopolysiloxane having per silicon atom at average of from 1.99 to 2.0 organic radicals attached to the silicon by silicon-carbon linkages, of which organic radicals at least 40 percent are methyl radicals and the remainder contain no active hydrogen capable of reacting with methylmagnesium chloride to give methane and (2) an organic isocyanate and having only one isocyanate group per molecule, said isocyanate group being attached to a carbon atom, whereby a gum having a degree of polymerization greater than that of (1) but equal to at least 1500 is obtained.

2. The method in accordance with claim 1 wherein the organic groups on the silicon are selected from the group consisting of monovalent hydrocarbon radicals and halogenated monovalent hydrocarbon radicals.

3. The method in accordance with claim 1 wherein the initial degree of polymerization of the organopolysiloxane (1) is at least 300.

4. The method in accordance with claim 2 wherein the initial degree of polymerization of the organopolysiloxane (1) is at least 300.

5. A method of preparing a high polymer diorganopolysiloxane which comprises heating in the absence of any other polymerization catalyst a mixture of (1) a mixture of at least two different organopolysiloxanes, said mixture (1) having an average degree of polymerization of at least 150, each polysiloxane containing per molecule at least two silicon-bonded hydroxyl groups and having per silicon atom an average of from 1.99 to 2.0 organic radicals attached to the silicon by silicon-carbon linkages, of which organic radicals at least 40 percent are methyl radicals and the remainder contain no active hydrogen capable of reacting with methylmagnesium chloride to give methane and (2) an organic isocyanate having only one isocyanate group per molecule, said isocyanate group being attached to a carbon atom whereby a gum having a degree of polymerization greater than that of (1) but equal to at least 1500 is obtained.

6. The method in accordance with claim 5 wherein at least one of the polysiloxanes in mixture (1) has an average degree of polymerization of at least 300.

7. The method in accordance with claim 6 wherein the organic groups on the silicon are selected from the group consisting of monovalent hydrocarbon radicals and halogenated monovalent hydrocarbon radicals.

References Cited in the file of this patent
UNITED STATES PATENTS

| | | |
|---|---|---|
| 2,780,611 | Te Grotenhuis | Feb. 5, 1957 |
| 2,931,786 | Clark et al. | Apr. 5, 1960 |

OTHER REFERENCES

Chem. Abstracts, vol. 25, pp. 4535 and 4536, abstract of an article by Dolgov et al., Zhur. Obshchei. Khim., Khim. Ser., vol. 1, pp. 91–104 (1931).